United States Patent [19]

Wilform, Jr. et al.

[11] Patent Number: 4,725,022

[45] Date of Patent: Feb. 16, 1988

[54] FUEL DISCARDING DEVICE

[76] Inventors: Robert D. Wilform, Jr., 45 Maiden La., York, S.C. 29745; George Spector, 233 Broadway RM 3815, New York, N.Y. 10007

[21] Appl. No.: 20,574

[22] Filed: Mar. 2, 1987

[51] Int. Cl.⁴ .............................................. B64D 37/26
[52] U.S. Cl. ............................ 244/135 R; 137/614.11
[58] Field of Search ........... 244/135 R, 135 A, 135 C, 244/136, 94; 137/613, 614.11; 251/294

[56]     References Cited
       U.S. PATENT DOCUMENTS

| | | | |
|---|---|---|---|
| 2,283,502 | 5/1942 | Hughes et al. | 244/135 R |
| 2,354,573 | 7/1944 | Brock | 244/135 R |
| 3,096,054 | 7/1963 | Ciminaghi | 244/135 R |

Primary Examiner—Joseph F. Peters, Jr.
Assistant Examiner—Rodney Corl

[57]              ABSTRACT

A fuel discarding device is provided which is built into a fuselage of an aircraft for releasing fuel from a fuel line into the atmosphere when the aircraft is in danger of crashing.

5 Claims, 4 Drawing Figures

FUEL DISCARDING DEVICE

BACKGROUND OF THE INVENTION

The instant invention relates generally to fuel supply systems and more specifically it relates to a fuel discarding device.

Numerous fuel supply systems have been provided in prior art that are adapted to empty the fuel of a carburetor float bowl back into the fuel tank. For example, U.S. Pat. Nos. 2,965,086; 2,986,133 and 3,534,721 all are illustrative of such prior art. While these units may be suitable for the particular purpose to which they address, they would not be as suitable for the purposes of the present invention as heretofore described.

SUMMARY OF THE INVENTION

A primary object of the present invention is to provide a fuel discarding device that will overcome the shortcomings of the prior art devices.

Another object is to provide a fuel discarding device that is built into fuselage of an aircraft for releasing the fuel therefrom into the atmosphere when the aircraft is in danger of crashing.

An additional object is to provide a fuel discarding device that is operable from the cockpit of the aircraft by one of the crew members.

A further object is to provide a fuel discarding device that is simple and easy to use.

A still further object is to provide a fuel discarding device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
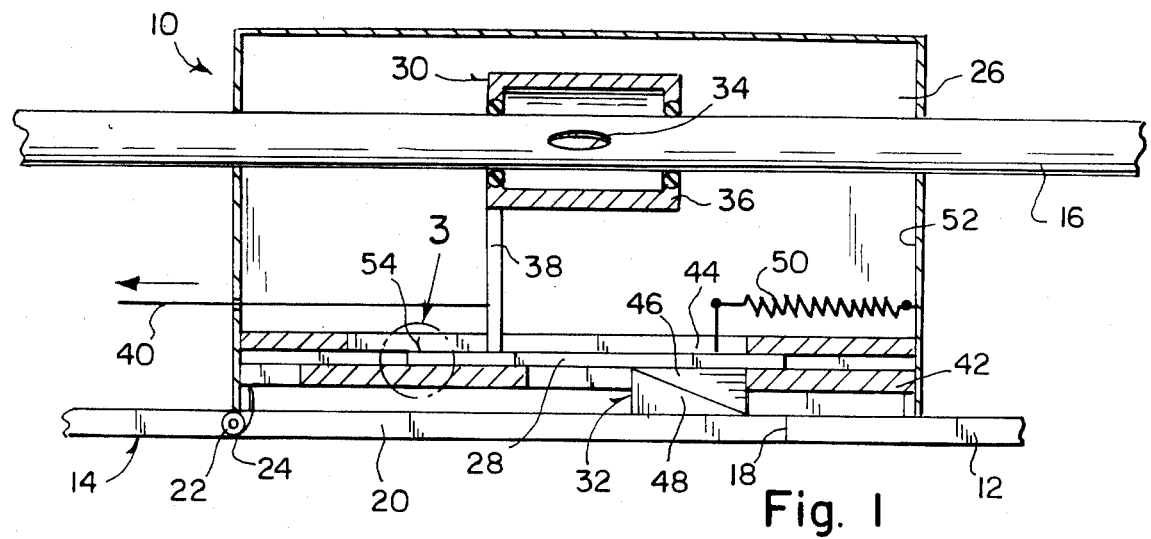
FIG. 1 is a cross sectional view of the invention in a closed position.
Figure 2:
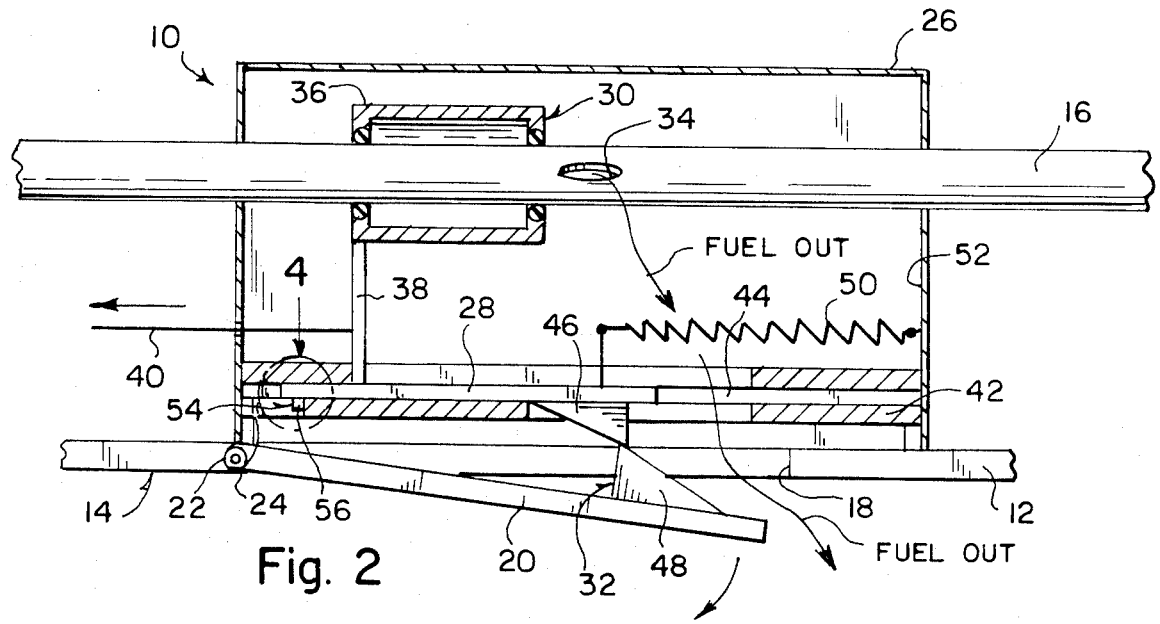
FIG. 2 is a cross sectional view of the invention in a open position so that the fuel will be discarded.

Turning now descriptively to the drawings, in which similar reference characters denote similar elements throughout the several views, FIGS. 1 and 2 illustrate a fuel discarding device 10 built into a fuselage 12 of an aircraft 14 for releasing fuel from a flue line 16 into the atmosphere when the aircraft 14 is in danger of crashing. The device 10 consists of a fuselage 12 having an aperture 18 therein. A door 20 is hinged at 22 onto the fuselage 12 at the aperture 18 and is spring biased inwardly at 24 to a closed position. A housing 26 is mounted within a fuselage 12 at the hinged door 20 with the fuel line 16 extending through the housing 26.

A slide door 28 is mounted within the housing 26 adjacent the hinged door 20. A mechanism 30 is provided for releasing the fuel from the fuel line 16 into the housing 26. Another mechanism 32 is provided for opening both the slide door 28 and the hinged door 20 is simultaneously when the fuel is released from the fuel line 16 thus allowing the fuel to exit the fuselage 12.

The releasing mechanism 30 includes the fuel line 16 having a hole therein 34 and a sealed sleeve 36 slideably mounted over the fuel line 16 at the hole 34. A post 38 extends from the sleeve 36 with an elongated cord 40 attached to the post 38 extending to cockpit (not shown) of the aircraft 14. When the cord 40 is pulled by a crew member (not shown) the sleeve 36 will slide over to expose the hole 34 in the fuel line 16 allowing the fuel to exit therefrom.

The opening mechanism 32 includes a track unit 42 having an opening 44 therethrough so that the slide door 28 can ride therein. The slide door 20 has an outwardly facing wedge 46 thereon and the slide door is attached to the post 38. The hinged door 20 has an inwardly facing wedge 48 thereon to make contact with the outwardly facing wedge 46. When the cord 40 is pulled by the crew member the slide door 28 will slide over to an opened position with wedges 46, 48 making contact thus allowing the hinged door 20 to open from the fuselage 12.

Figure 3:
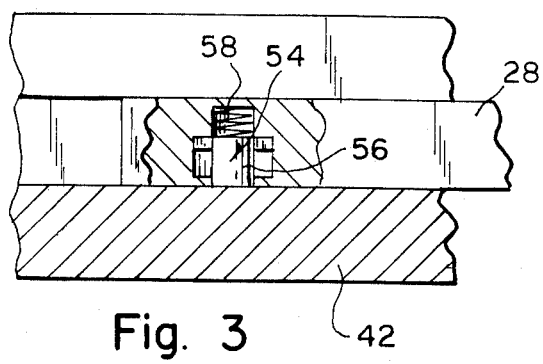
FIG. 3 is an enlarged cross sectional detail view as indicated by numeral 3 in FIG. 1 showing the locking pin in a closed position.
Figure 4:
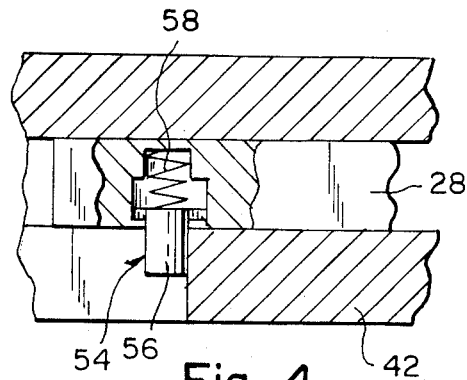
FIG. 4 is an enlarged cross sectional detail view as indicated by numeral 4 in FIG. 2 showing the locking pin in an open position.

A spring 50 is mounted between side wall 52 of the housing 26 and the slide door 28 to return the slide door to a closed position after the cord 40 pulls the slide door 28 to the open position. A mechanism 54 is also provided for locking the slide door 28 in the track unit 42 in the opened position when the cord 40 is pulled all the way. As best seen in FIGS. 3 and 4 the locking mechanism 54 includes a pin 56 mounted within the slide door 28 remote from the outwardly facing wedge 46 and a spring 58 that will pop the pin 56 out into the track unit 42 when the cord 40 is pulled all the way thus preventing the slide door 28 to return to the closed position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A fuel discarding device built into a fuselage of an aircraft for releasing fuel from a fuel line into the atmosphere when the aircraft is in danger of crashing, said device comprising:
   (a) the fuselage having an aperture therein;
   (b) a door hinged onto the fuselage at said aperture and spring biased inwardly to a closed position;
   (c) a housing mounted within the fuselage at said hinged door with the fuel line extending through said housing;
   (d) a slide door mounted within said housing adjacent said hinged door;
   (e) means for releasing the fuel from the fuel line into said housing; and
   (f) means for opening both said slide door and said hinged door simultaneously when the fuel is released from the fuel line thus allowing the fuel to exit the fuselage.

2. A fuel discarding device as recited in claim 1, wherein said releasing means includes:

(a) the fuel line having a hole therein;
(b) a sealed sleeve slideably mounted over the fuel line at said hole;
(c) a post extending from said sleeve; and
(d) an elongated cord attached to said post extending to cockpit of the aircraft whereby when said cord is pulled by a crew member said sleeve will slide over to expose said hole in the fuel line allowing the fuel to exit therefrom.

3. A fuel discarding device as recited in claim 2, wherein said opening means includes:
(a) a track unit having an opening therethrough so that said slide door can ride therein;
(b) said slide door having an outwardly facing wedge thereon and said slide door attached to said post; and
(c) said hinged door having an inwardly facing wedge thereon to make contact with said outwardly facing wedge whereby when said cord is pulled by the crew member the slide door will slide over to an opened position with said wedges making contact thus allowing said hinged door to open from the fuselage.

4. A fuel discarding device as recited in claim 3, further comprising:
(a) a spring mounted between side wall of said housing and said slide door to return said slide door to a closed position after said cord pulls said slide door to said opened position; and
(b) means for locking said slide door in said track unit in said opened position when said cord is pulled all the way.

5. A fuel discarding device as recited in claim 4, wherein said locking means includes a pin mounted within said slide door remote from said outwardly facing wedge and a spring that will pop said pin out into said track unit when said cord is pulled all the way thus preventing said slide door to return to said closed position.

* * * * *